(12) United States Patent
Palmer

(10) Patent No.: US 8,885,873 B2
(45) Date of Patent: Nov. 11, 2014

(54) SYSTEMS AND METHODS FOR USING CURVATURES TO ANALYZE FACIAL AND BODY FEATURES

(75) Inventor: Francis R. Palmer, Beverly Hills, CA (US)

(73) Assignee: Francis R. Palmer III MD Inc., Beverly Hills, CA (US)

( * ) Notice: Subject to any disclaimer, the term of this patent is extended or adjusted under 35 U.S.C. 154(b) by 302 days.

(21) Appl. No.: 13/607,067

(22) Filed: Sep. 7, 2012

(65) Prior Publication Data

US 2013/0243338 A1 Sep. 19, 2013

Related U.S. Application Data

(60) Provisional application No. 61/532,837, filed on Sep. 9, 2011.

(51) Int. Cl.
*G06K 9/00* (2006.01)

(52) U.S. Cl.
CPC ........ *G06K 9/00362* (2013.01); *G06K 9/00221* (2013.01)
USPC .......................................... 382/100; 382/203

(58) Field of Classification Search
None
See application file for complete search history.

(56) References Cited

U.S. PATENT DOCUMENTS

| | | | |
|---|---|---|---|
| 5,867,588 A * | 2/1999 | Marquardt | 382/118 |
| 7,436,988 B2 | 10/2008 | Zhang et al. | |
| 7,564,990 B2 * | 7/2009 | Kern et al. | 382/100 |
| 7,634,103 B2 | 12/2009 | Rubinstenn et al. | |
| 8,194,093 B2 | 6/2012 | Perlman et al. | |
| 2003/0065255 A1 | 4/2003 | Giacchetti et al. | |
| 2003/0130035 A1 * | 7/2003 | Kanarat | 463/31 |
| 2005/0144029 A1 * | 6/2005 | Rakowski et al. | 705/1 |
| 2007/0040907 A1 * | 2/2007 | Kern et al. | 348/77 |
| 2007/0047761 A1 * | 3/2007 | Wasilunas et al. | 382/100 |
| 2008/0004109 A1 * | 1/2008 | Kanarat | 463/30 |
| 2008/0267443 A1 * | 10/2008 | Aarabi | 382/100 |
| 2008/0270175 A1 * | 10/2008 | Rodriguez et al. | 705/2 |
| 2009/0257654 A1 * | 10/2009 | Roizen et al. | 382/190 |
| 2009/0316022 A1 * | 12/2009 | Hatano | 348/240.99 |
| 2010/0111370 A1 * | 5/2010 | Black et al. | 382/111 |
| 2011/0135205 A1 * | 6/2011 | Rhee | 382/195 |
| 2013/0315475 A1 * | 11/2013 | Song et al. | 382/154 |

OTHER PUBLICATIONS

Brunelli et al "Face Recognition: Features versus Templates" IEEE Transation on Pattern Analysis and Machine Intelligence vol. 15 No. 10 1993.*
Aarabi et al. "The automatic measurement of Facial Beauty" IEEE 2001.*
Anaface—Facial Beauty Analysis—Score your face, http://www.anaface.com/.
Bass, J.W., "Beauty Can be Explained by Proportions", RealSelf, http://www.realself.com/article/beauty-explained-proportions, 2012.
Greyviremia, "give me lobster AND FAME", blog, May 15, 2009, http://greyviremia.livejournal.com/44780.html.

(Continued)

*Primary Examiner* — Sean Motsinger
(74) *Attorney, Agent, or Firm* — Fish & Tsang LLP

(57) ABSTRACT

Systems and methods of providing an attractiveness analysis are disclosed. In some embodiments, an electronic analysis platform is configured to obtain image data and curvature data to provide an attractiveness analysis to a user via a physical interface. Curvature data could comprise any data indicative of a curvature of a physical feature or a depiction thereof, including shadow data and pixilation data.

3 Claims, 5 Drawing Sheets

(56) References Cited

OTHER PUBLICATIONS

"The facial proportions of beautiful people", Majorityrights.com, http://majorityrights.com/weblog/comments//the_facial_proportions_of_beautiful_people.

Palmer, F., "What's Your Number", Morgan James Publishing, Chapter 4-6, 2009.

Patnaik, V.V.G. et al., "Anatomy of 'a Beautiful Face & Smile'", Journal of Anatomical Society of India, vol. 52, No. 1, pp. 74-80, 2003.

\* cited by examiner

SYSTEMS AND METHODS FOR USING CURVATURES TO ANALYZE FACIAL AND BODY FEATURES

This application claims the benefit of priority to U.S. Provisional Application No. 61/532,837, filed on Sep. 9, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is facial and body attractiveness analysis.

BACKGROUND

The following background discussion includes information that may be useful in understanding the present invention. It is not an admission that any of the information provided herein is prior art or relevant to the presently claimed invention, or that any publication specifically or implicitly referenced is prior art.

Beauty care specialists, physicians, and others have long analyzed some physical features in order to identify items of attractiveness as well as to determine how to improve a person's attractiveness. Various articles present the results of such analysis. These include "*Anatomy of 'A Beautiful Face & Smile*'," by Patnaik, et al, J. Anat. Soc. India 52(1) 74-80 (2003); "*Beauty Can be Explained by Proportions*," by Bass, John W., available at http://www.realself.com/article/beauty-explained-proportions; and "*The Facial Proportions of Beautiful People*," available at http://majorityrights.com/weblog/comments//the_facial_proportions_of_beautiful_people.

Based on the various factors that have been thought to determine attractiveness over the years, many others have attempted to provide beauty analysis to users based on images. For example, US Patent Application Publication No. 2008/0004109 to Kanarat describes a gaming system that provides a celebrity match and facial attractiveness score based upon how similar that person's face is to a celebrity, and based on the size and position of facial features. US Patent Application Publication No. 2007/0047761 to Wasilunas analyzes facial symmetry, hair growth patterns and spatial data to provide beauty advice to a user.

Kanarat and Wasilunas, however, do not appear to focus on curvatures of a person's features, and instead look at the size and positions of features, a comparison of a user's face to celebrity faces, or facial symmetry, hair growth patterns and spatial data, which to the Applicant's knowledge, are not accurate indicators of beauty, in and of themselves.

U.S. Pat. No. 7,634,103 to Rubinstenn teaches using a 3-D facial image to provide beauty product suggestions to a user. However, Rubinstenn also fails to focus on curvature to provide accurate and individualized attractiveness scores or analysis.

One of the current inventor's own books, The Palmer Code (April 2009), describes manual methods of analyzing attractiveness of human faces, and calculating attractiveness scores. As disclosed in the prior art, however, The Palmer Code, also fails to analyze curvatures to determine attractiveness.

U.S. Pat. No. 8,194,093 to Perlman does use facial curvatures as part of an analysis, but that use is only with respect to determining facial movements rather than attractiveness.

The Anaface website, http://www.anaface.com/, claims to provide facial beauty analysis to users based upon photographs. There again, however, Anaface appears to base its "analysis" on facial symmetry and the length and width of certain features, without considering curvatures. (See e.g., http://greyviremia.livejournal.com/44780.html).

Thus, there is still a need for improved systems and methods that analyze facial or body curvatures in assessing attractiveness scores.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

SUMMARY OF THE INVENTION

The inventive subject matter provides apparatus, systems and methods in which an electronic analysis platform is configured to receive image data, obtain curvature data from the image data, and provide a user with an attractiveness score based at least partially on the curvature data. The curvature data could comprise, for example, shadow or shading data, a degree of curvature, a degree of shadowing, a pixilation analysis, or any combination thereof.

The curvature data could be obtained through any known method, including for example, analysis of a 3-D image, gradation of pixels, color density, luminance contrast, surface triangulation, cross patch, partial derivative technique, grayscale image conversion and analysis, RGB image conversion and analysis, and so forth. For example, where the feature is skin and the image is a grayscale image, a curvature data could be extracted from image data by determining the ratio of darker pixels to lighter pixels, the darkness or lightness or each pixel, and the location of darker pixels relative to lighter pixels.

As used herein, the term "attractiveness score" is used very broadly to include, for example, a score representing attractiveness, beauty, sexiness, desirableness, or suitability for a particular activity (e.g., a sport).

From a user perspective, the user (1) takes, uploads or sends an image (e.g., a photograph or video) to an electronic analysis platform, and (2) obtains an attractiveness score, via a physical user interface. Contemplated user interfaces could be provided via a display of a user device, including for example, a mobile telephone, a desktop computer, a laptop computer, a game having a display and a camera, or any other device capable of sending or receiving graphics, texts or audio.

From the perspective of the electronic analysis platform, image data is received, an attractiveness score is obtained based at least in part on image data and curvature data, and the attractiveness score is sent to a user interface.

The electronic analysis platform can be configured as a service that could be provided over a wired or wireless communications network. The platform or service can advantageously be implemented as one or more software modules executable by at least one processing unit (e.g., processor or processing core). In some embodiments, the electronic analysis platform can comprise a computer program configured to access a database (e.g., a database storing image data and corresponding attractiveness scores or analysis data), or a second platform, server or service.

Contemplated image data can comprise a depiction of one or more physical features of a person, including an entire face or body. As used herein, the term "physical feature" is used very broadly to include for example, (1) an eyebrow, a pair of eyebrows, an eye, a pair of eyes, a nose, a mouth, a lip, a check, a forehead, an ear, a pair of ears, or any other facial feature, or (2) a waist, a chest, a pair of arms, a pair of shoulders, a back, a buttocks, a pair of legs, or any other bodily feature. It is also contemplated that physical features sometimes includes an area of skin surrounding a facial feature, e.g., an eye and the area of skin surrounding the eye.

Where a depiction of more than one physical feature composes the image data, it is contemplated that the analysis platform could additionally obtain a symmetry analysis, or a spatial analysis, between two or more of the features or curvatures.

The electronic analysis platform, and/or a module accessible by the platform, could convert the received image data, using existing technologies (e.g., Adobe™, ArcSoft™, etc.) into a 3-D, grayscale, or other image data representation in order to allow for a more detailed curvature or other analysis data.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to computer/server based systems, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
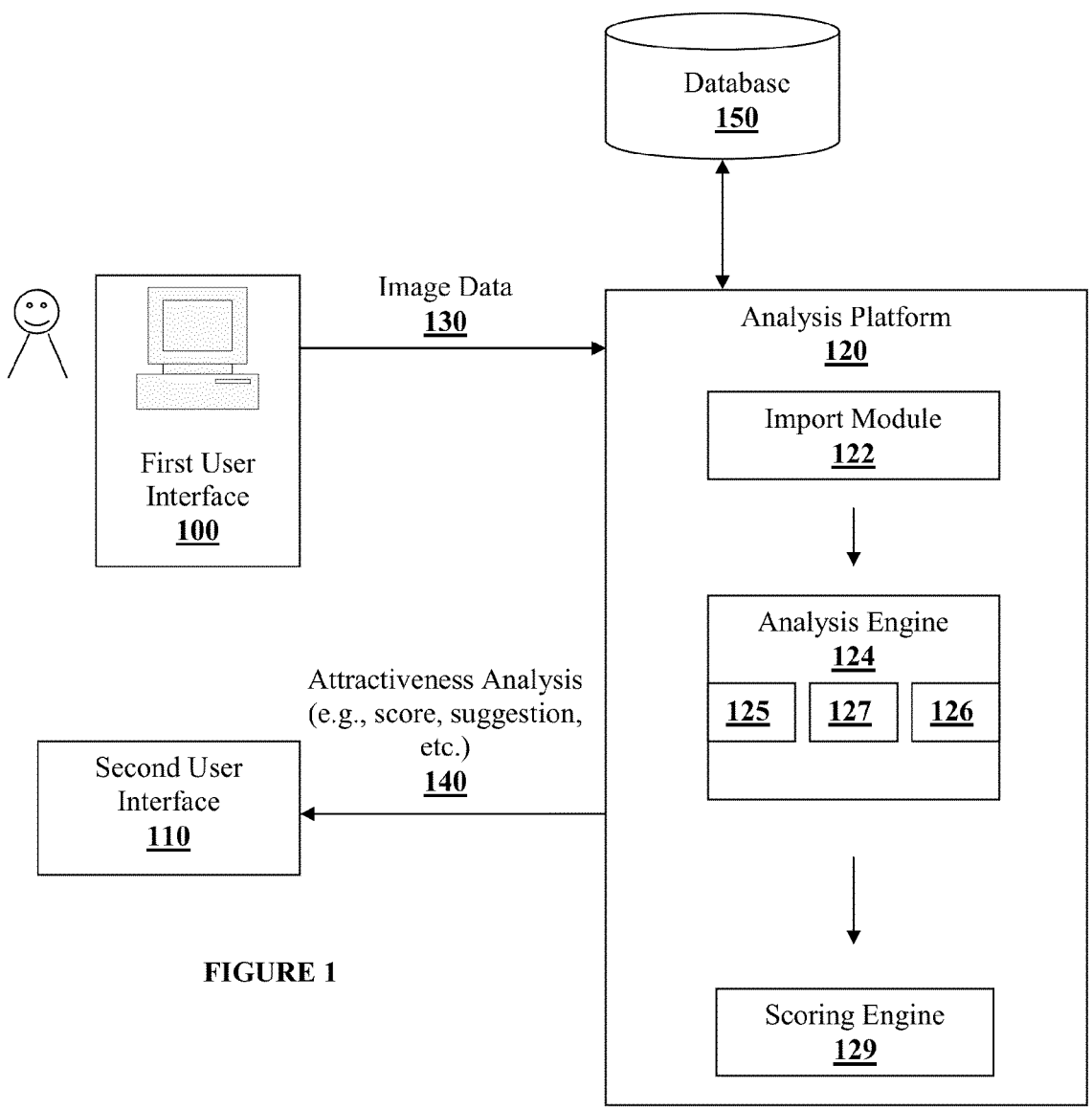
FIG. 1 is a schematic of a system according to the inventive subject matter.

FIG. 1 shows one embodiment of a system of the inventive subject matter. In FIG. 1, a first user interface (e.g., provided by a mobile phone, a desktop computer, a television, a tablet computer, an arcade game screen, etc.) 100 transmits image data 130 to analysis platform 120. The analysis platform 120 comprises an import module 122 configured to receive the image data 130. Analysis platform 120 further comprises an analysis engine 124, which comprises at least one of a curvature analysis module 125, a symmetry analysis module 126, and a spatial analysis module 127, or any other relevant analysis data obtaining module. Analysis platform 120 obtains at least one analysis data (e.g., a curvature data, a symmetry data, a spatial data, etc.) of at least one feature via analysis engine 124. The analysis data is sent to scoring engine 129, which calculates or otherwise obtains an attractiveness score using some or all of the analysis data. Once the analysis platform 120 obtains an attractiveness score, the score 140 is sent to a second user interface. Second interface 110 could be any physical interface, and could be the same as, or different from, the first interface.

Alternatively or in addition to an attractiveness score, it is contemplated that the analysis platform could obtain and provide a recommendation (e.g., of a beauty product, a procedure, a style, etc.).

In FIG. 1, analysis engine 124 and scoring engine 129 are located within analysis platform 120. However, it is contemplated that an analysis engine or scoring engine could alternatively or additionally be located exterior to an analysis platform, and configured to exchange data or otherwise communicate with the analysis platform.

In some embodiments, the analysis data could be sent to a person who calculates an attractiveness score, thereby bypassing the need for a scoring engine. Analysis data obtained from modules 125-127 could be given the same or different amount of weight in calculating an attractiveness score.

It is contemplated that each analysis data or attractiveness score could be determined based on (1) pre-selected standards (e.g., predetermined scores corresponding to a degree of shading or pre-selected images), (2) an independent analysis (e.g., viewing or analyzing a shadowing pattern without any comparison), or (3) a combination thereof.

As used herein, the term "spatial data" is used broadly to include, for example, a length, a width, a distance between, a fullness of, a volume of, or any combination thereof.

As used herein, the term "symmetry data" is used broadly to include, for example, any information (e.g., a mirror image or one side superimposed on another side and compared) that could be beneficial in determining how symmetrical one side of a feature, a body or a face, is to another side.

As used herein, the term "curvature data" is used broadly to include, for example, a degree of curvature, a shadow data, a degree of shadowing, a gradation of pixilation, a ratio of light to dark pixels in a given area, a length of shading, or any other suitable data representative of a curve.

Figure 2:
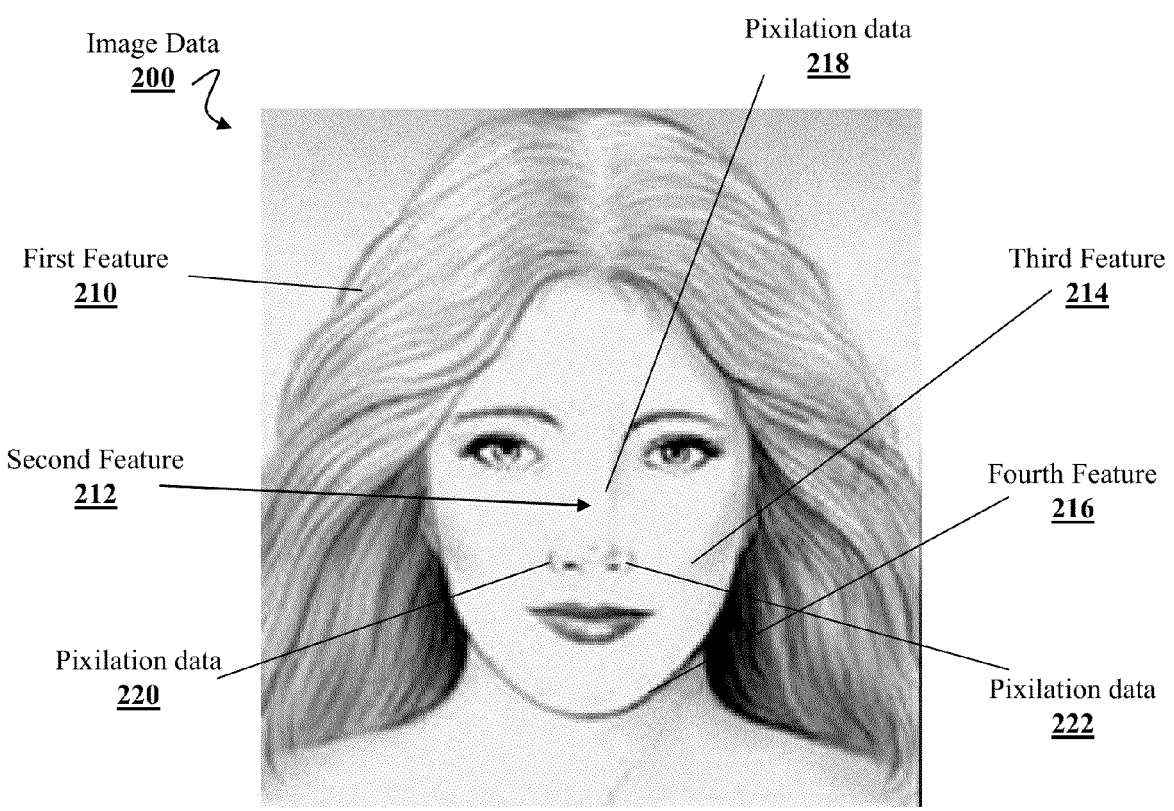
FIG. 2 is a schematic of a grayscale photograph showing four features for analysis.

FIG. 2 shows image data (e.g., a grayscale image) comprising a depiction of various features. In FIG. 2, image data 200 comprises various facial features to be used in an attractiveness analysis. Each of the features or depictions thereof could be analyzed using the same data, e.g. curvature data.

Alternatively, it is contemplated that some or all of the features or depictions thereof could be analyzed using different analysis data. For example, (1) first feature 210 (e.g., hair) could be analyzed for volume data, curve data, fullness data, color data, length data, and style data, (2) second feature 212 (e.g., a nose) could be analyzed for curvature data based on shadow or pixilation data 218, 220, or 222, a width, a length, a width of the nose compared to a width of the face, and a volume data, (3) third feature 214 (e.g., a cheek) could be analyzed based on spatial data (as described in FIG. 3), a color, and a position, and (4) fourth feature 216 (e.g., a chin) could be analyzed based on spatial data, a volume data, a pointiness, a curvature, and a proximity to a mouth.

As used herein, a reference to an analysis of a feature should be interpreted as encompassing analyzing a feature or analyzing a depiction of a feature. Thus, an analysis data could comprise an analysis of a feature or a depiction of a feature.

An attractiveness score for image data 200 could be calculated using analysis data of each of the first through fourth features (210, 212, 214, and 216), or using analysis data of only one or some of the features. For analysis data considered in obtaining an attractiveness score, one item of analysis data could be given more or less weight than another item of analysis data. For example, in FIG. 2, an attractiveness score could be obtained using a curvature data of the first feature, a spatial data of the second feature, a spatial and curvature data of the third feature, and a spatial data of the fourth feature. The amount of weight given to the first feature could be 10%, while the amount of weight given to each of the second, third, and fourth features is 30%. Finally, the 30% weight given to the third feature could be divided as 20% weight for curvature data and 10% weight for spatial data.

Figure 3:
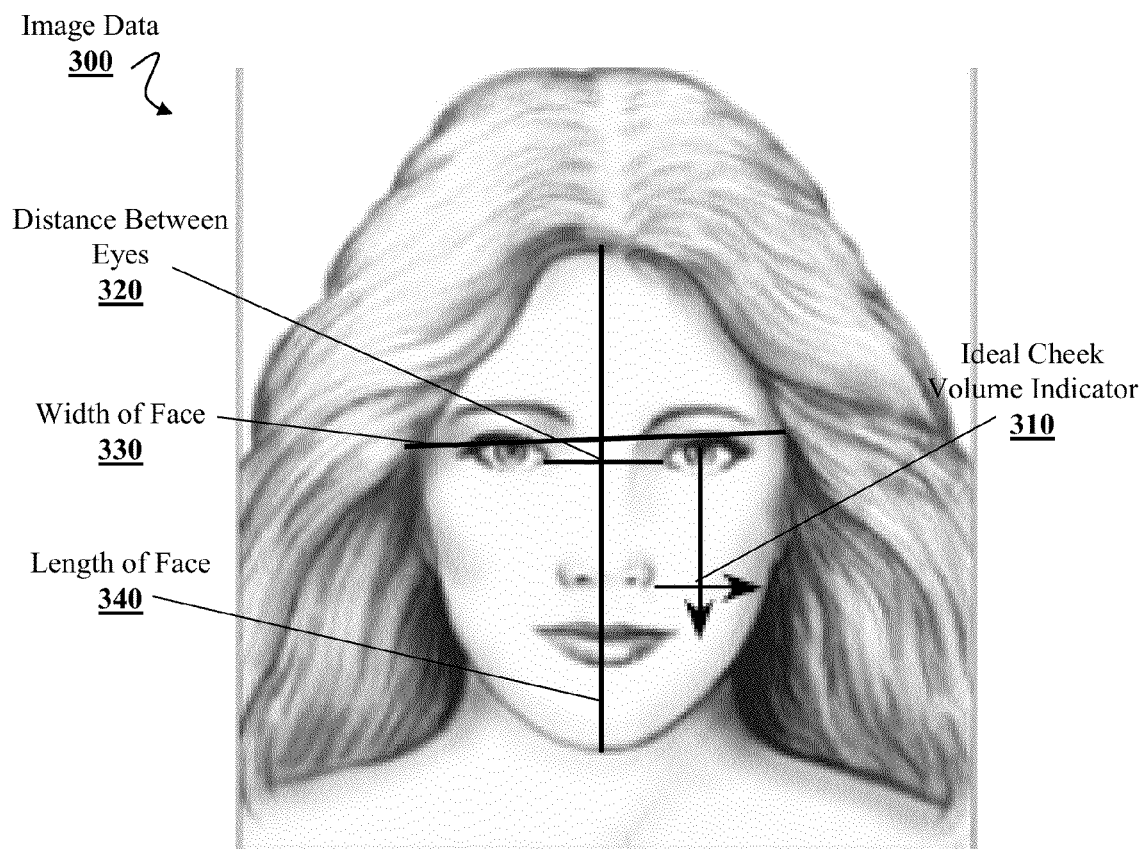
FIG. 3 is a schematic of a photograph showing various areas of spatial analysis.

FIG. 3 shows how a spatial analysis could be performed by a spatial analysis module. In FIG. 3, image data 300 is analyzed by measuring the distance between eyes 320, a width of the face 330, a length of the face 340, and a match-score based on an analysis of an analysis data with respect to ideal cheek volume indicator 310. Ideal cheek volume indicator 310 comprises two lines intersecting at a point. While the two intersecting lines could be drawn along any portions of a face, it is preferred that the first vertical line is drawn through a pupil, and the second horizontal line is drawn across a bottom of the nostril (for women) or a little bit higher (for men). The point of intersection indicates where a bottom portion of a cheekbone extends to in an ideal or most attractive cheek.

It is contemplated that a high degree of curvature, distance, symmetry, or other measurement could lead to a higher or lower attractiveness score. For example, while a high degree of curvature could be desirable for a buttocks, it could be undesirable for an arm. Moreover, a larger length (e.g., of a face) could be desirable for a taller person, while a smaller length could be desirable for a shorter person.

It is also contemplated that an attractiveness score could be tailored to what is considered attractive or desirable in a profession or locale. For example, longer arms and legs with a lot of curvature could be desirable for a female basketball player, while shorter arms and legs and a long torso could be desirable for a female gymnast. With regard to locale, a rounder face could be desirable in a given city, state or country, while a more angular face could be desirable in another. Attractiveness scores could also be dependent on the sex of a person.

Figure 4:
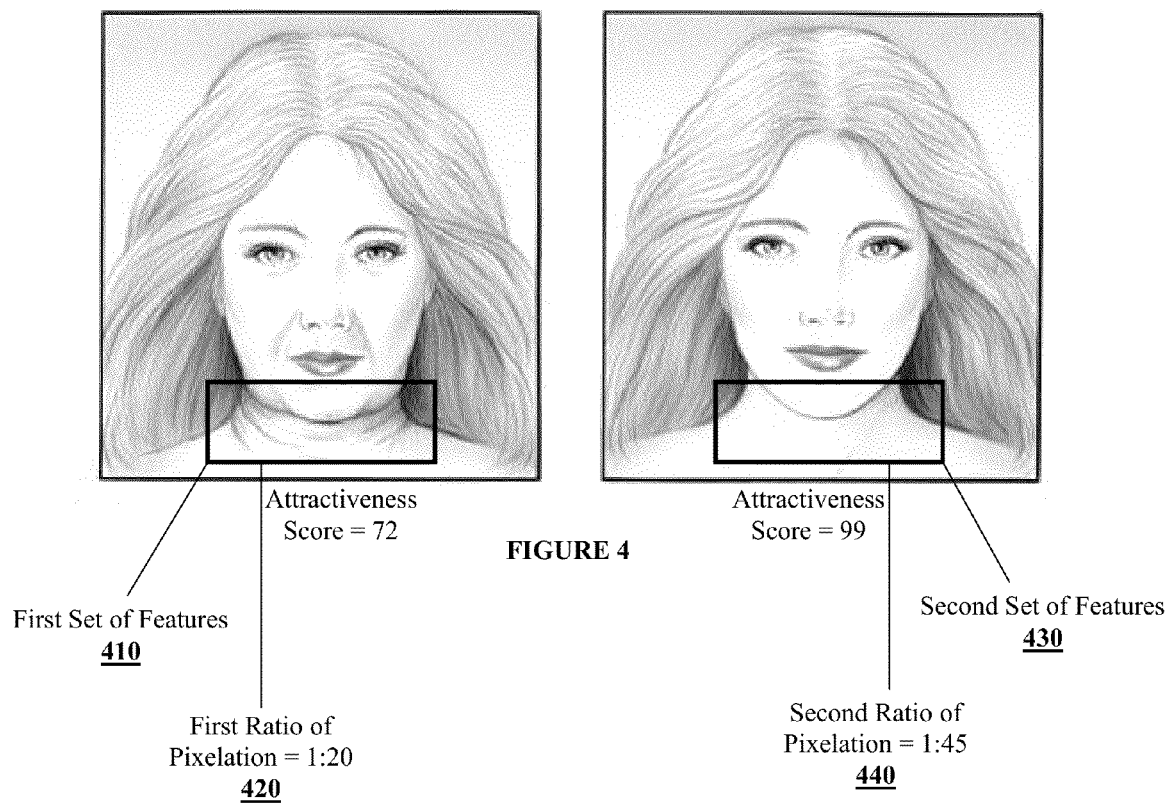
FIG. 4 is a schematic of a comparison of pixilation in two photographs.

In FIG. 4, a comparison of two female chin and neck areas are shown. Here, the attractiveness scores could be determined for each woman based on a ratio of dark to light pixilation 420 and 440 in and around those features 410 and 430, respectively. The image on the right received an attractiveness score of 99 because there is a low ratio of dark to light pixilation. The image on the left received an attractiveness score of 72 because of the higher ratio of dark to light pixilation, as well as the location of the darker pixels.

While the attractiveness score of FIG. 4 is based on curvature data of only two features, it is contemplated that attractiveness scores could be based on any analysis data of 1, 5, 10, or even 100 or more features.

Figure 5:
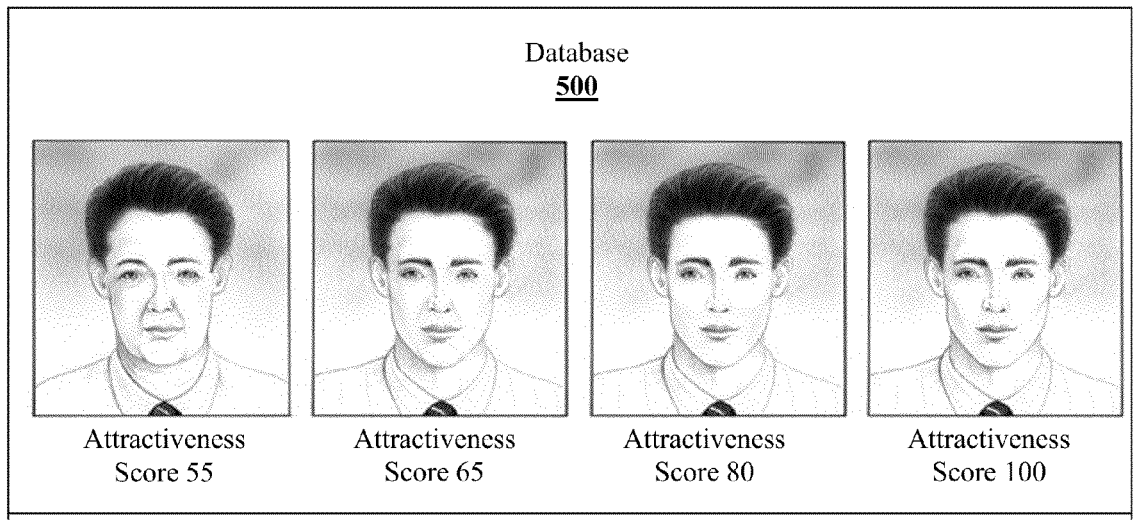
FIG. 5 is a schematic of sample pre-scored attractiveness scores based in part on curvatures.

In FIG. 5, a predetermined set of attractiveness scores and corresponding image data stored in a database 500 is shown. The database could comprise scores and analysis or image data(s) related to individual features, a set of features, or an entire body, face or person. It is contemplated that an analysis platform could obtain an analysis data or attractiveness score via a comparison of a received image data and one or more database image data and corresponding analysis data or attractiveness scores.

An attractiveness score could be based on any scale, including for example, 0-99, A-Z, low to high, below average to above average, a combination thereof, or any other suitable scale. It is also contemplated that an attractiveness score could be a categorization (e.g., exotic beauty, classic beauty, etc.) returned to a user interface based at least in part on curvature data.

As used herein, the term "obtain" is used very broadly to include, for example, deriving, recognizing, extracting, sending an item or data to an outside service that derives or recognizes, or even showing the item or data to a human who enters an analysis or score.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for providing an attractiveness analysis, comprising:
    a physical user interface functionally coupled to an electronic analysis platform; and
    wherein the analysis platform is configured to:
        receive image data comprising a depiction of at least one of a face and a body of a person;
        obtain a first curvature data of a first physical feature of the face or body;
        obtain a second curvature data of a second physical feature of the face or body;
        provide to the user, through the user interface, an attractiveness score based at least in part on the first and second curvature data; and
    wherein the image data comprises a depiction of a face, wherein each of the first curvature data and the second curvature data comprises a degree of shadowing, and wherein the first physical feature comprises a cheek and the second physical feature comprises a jaw.

2. The system of claim 1, wherein the analysis platform is further configured to obtain a symmetry analysis of at least one of the first and second physical features.

3. The system of claim 1, wherein the analysis platform is further configured to obtain a spatial analysis of a space between the first and second physical features.

\* \* \* \* \*